United States Patent
Choi et al.

(10) Patent No.: US 10,230,082 B2
(45) Date of Patent: Mar. 12, 2019

(54) BATTERY UNIT

(71) Applicant: HYUNDAI MOTOR COMPANY, Seoul (KR)

(72) Inventors: Yong Hwan Choi, Yongin-si (KR); Hae Kyu Lim, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 177 days.

(21) Appl. No.: 15/371,619

(22) Filed: Dec. 7, 2016

(65) Prior Publication Data

US 2018/0097211 A1 Apr. 5, 2018

(30) Foreign Application Priority Data

Sep. 30, 2016 (KR) .................. 10-2016-0126766

(51) Int. Cl.
*H01M 2/10* (2006.01)
*H01M 2/20* (2006.01)

(52) U.S. Cl.
CPC ......... *H01M 2/1077* (2013.01); *H01M 2/206* (2013.01); *H01M 2220/20* (2013.01)

(58) Field of Classification Search
CPC .......... H01M 10/625; H01M 10/6562; H01M 10/0481; H01M 10/486; H01M 10/6557; H01M 10/6563; H01M 10/6551; H01M 10/647; H01M 10/613; H01M 2/1077; H01M 2/206

See application file for complete search history.

(56) References Cited

U.S. PATENT DOCUMENTS

| | | | |
|---|---|---|---|
| 2006/0204840 A1* | 9/2006 | Jeon ................... | H01M 2/1077 429/152 |
| 2012/0052359 A1* | 3/2012 | Yoshitake .......... | H01M 2/1077 429/120 |
| 2016/0141712 A1* | 5/2016 | Choi ................... | H01M 2/1016 320/109 |

FOREIGN PATENT DOCUMENTS

| | | |
|---|---|---|
| JP | 2012-238603 A | 12/2012 |
| JP | 5521442 B2 | 6/2014 |
| JP | 2014-157721 A | 8/2014 |
| JP | 2014-222662 A | 11/2014 |
| JP | 2016-115486 A | 6/2016 |
| KR | 10-2015-0068639 A | 6/2015 |

OTHER PUBLICATIONS

Office Action of corresponding Korean Patent Application No. 10-2016-0126766—8 pages, (dated Mar. 21, 2018).

* cited by examiner

*Primary Examiner* — Jimmy Vo
(74) *Attorney, Agent, or Firm* — Knobbe Martens Olson & Bear LLP

(57) ABSTRACT

Disclosed is a battery unit providing predetermined surface pressure to battery cells and absorbing expansion of the battery cells, thereby increasing durability. Further, by dualizing components for absorbing surface pressure of the battery cells, the battery unit allows manufacturing cost to be reduced because the rest of the components are shared.

8 Claims, 7 Drawing Sheets

BATTERY UNIT

CROSS REFERENCE TO RELATED APPLICATION

The present application claims priority to Korean Patent Application No. 10-2016-0126766, filed Sep. 30, 2016, the entire contents of which is incorporated herein for all purposes by this reference.

BACKGROUND

Field

The present disclosure relates to a battery unit including battery cells.

Description of the Related Art

Recently, because of environmental problems and high oil prices, eco-friendly vehicles have attracted attention, and electric vehicles and hybrid vehicles that use electric energy for driving are being diversely developed.

A battery module, which is applied to the electric vehicles and hybrid vehicles, is generally in the form of a pouch type battery cell unit, in which a battery cell is received in a pouch. Herein, battery cell units are configured such that a plurality thereof is received in one battery pack case by being layered, and the number of the battery cell units is determined by energy requirement.

The foregoing discussion in the background section is intended merely to aid in the understanding of the background of the present invention, and does not constitute an admission of prior art.

SUMMARY

One aspect of the present invention provides a battery unit providing predetermined surface pressure to battery cells and absorbing expansion of the battery cells, thereby increasing durability. Another aspect of the present invention further proposes a battery unit allowing manufacturing cost to be reduced by dualizing components for absorbing surface pressure of the battery cells, because the rest of the components are shared.

Still another aspect of the present invention, there is provided a battery unit including: cell holders each provided with battery cells and configured to surround the battery cells; a deformable panel provided between the battery cells of each of the cell holders, connected to the cell holder, and absorbing expansion of the battery cells by being pressed and deformed by surface pressure applied to the battery cells when the battery cells expand; and a battery case receiving the cell holders and the deformable panel by layering the cell holders and the deformable panel.

Each of the cell holders may include a first cover and a second cover each provided with connection structures at upper and lower portions thereof; and the deformable panel may be disposed between the first cover and the second cover, and may include: mounting parts mounted through the connection structures provided at the upper and lower portions of the first cover and the second cover; and a deformable part provided between the battery cells, connected to the mounting parts provided at upper and lower portions of the deformable panel, and the deformable part being deformable by cell expansion.

The first cover and the second cover may be respectively provided with first seat grooves and second seat grooves in facing surfaces of the upper and lower portions thereof; and the mounting parts of the deformable panel may be provided with clip protrusions protruding toward opposite directions to be engaged with both the first seat grooves and the second seat grooves and locked thereto.

The deformable part of the deformable panel may alternately protrude toward a battery cell provided on a first side thereof and toward another battery cell provided on a second side thereof, along a longitudinal direction thereof.

After the deformable part protrudes toward a battery cell provided on a first side thereof, the deformable part may extend horizontally and protrude toward another battery cell provided on a second side thereof in a same manner.

A length of each of the mounting parts of the deformable panel may be shorter than a sum of thicknesses of the battery cells of each of the cell holders, and may be variable according to the thickness of the battery cells.

Each of the battery cells may be provided with an electric terminal, and each of the cell holders may be provided with a through-hole for allowing the electric terminal to penetrate therethrough.

The battery case may include: a pair of side frames provided with receiving grooves, with the cell holders being received in and being locked to the receiving grooves; an electrical connector provided with connection terminals connected to the receiving grooves of the side frames so as to be electrically connected to the battery cells; and a pair of end plates locked to opposite ends of the side frames to connect the pair of side frames to each other, thereby locking the cell holders as a whole.

The end plates may include: locking parts protrudingly provided at upper portions thereof; and support bars connected to the locking parts of the pair of end plates at opposite ends thereof so as to support the end plates.

The battery unit configured as described above provides predetermined surface pressure to battery cells and absorbs expansion of the battery cells, thereby increasing durability. Further, by dualizing components for absorbing surface pressure of the battery cells, it is possible to reduce manufacturing cost because the rest of the components shared.

A further aspect of the invention provides an automobile battery unit comprising: a plurality of battery cells, each having a first surface and a second surface that faces away from and is generally parallel to the first surface in its non-inflation state; a plurality of battery cell holders, each holding two or more of the plurality of battery cells, a first one of the plurality of battery cell holders holding first and second battery cells among the plurality of battery cells; a corrugated plate inserted between the first and second battery cells that are held within the first battery cell holder and are immediately neighboring each other, the corrugated plate comprising a first side and a second side facing away from the first side, wherein the first side comprises a plurality of first surfaces contacting the first surface of the first battery cell and the second side comprises a plurality of second surfaces contacting the second surface of the second battery cell such that the corrugated plate pushes the first and second battery cells away from each other and absorbs pressure from each of the first and second battery cells as at least one of the first and second battery cells inflates.

BRIEF DESCRIPTION OF THE DRAWINGS

The above and other features and other advantages of the present invention will be more clearly understood from the following detailed description when taken in conjunction with the accompanying drawings, in which.

DETAILED DESCRIPTION OF EMBODIMENTS

Figure 1:
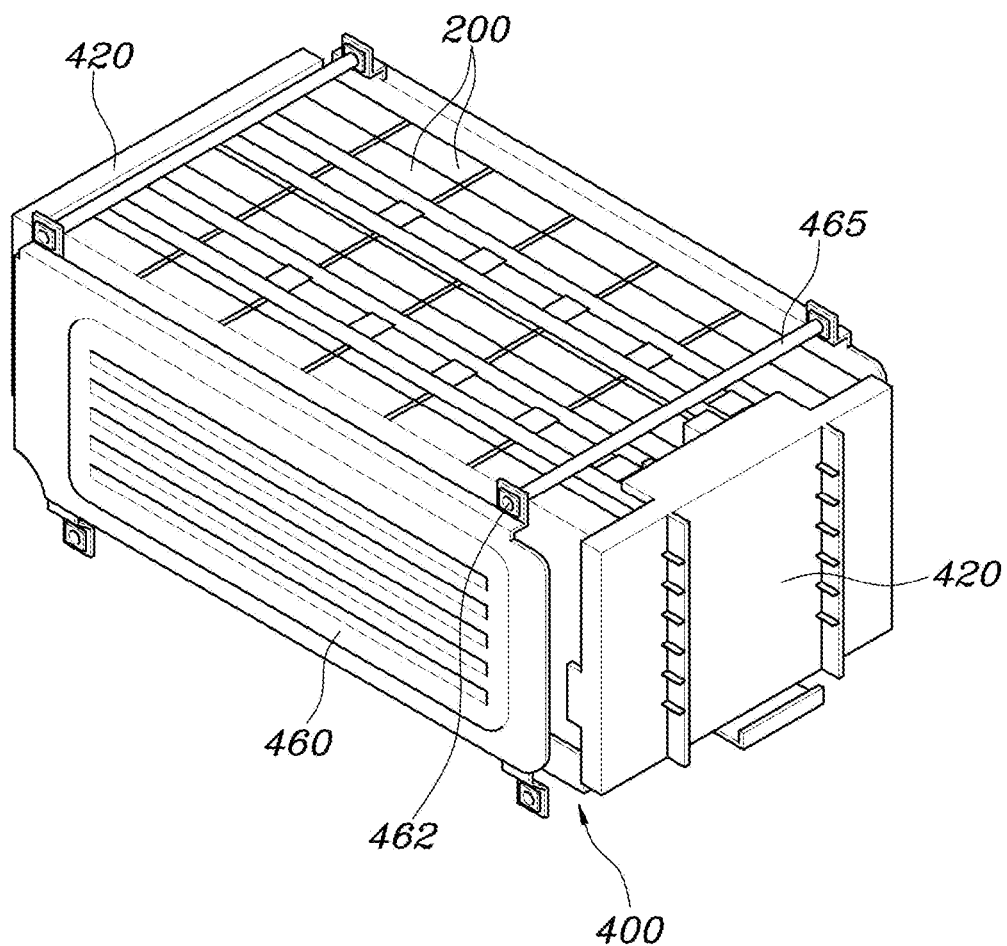
FIG. 1 is a perspective view showing a battery unit according to an embodiment of the present invention.

Hereinbelow, exemplary embodiments of the present invention will be described in detail with reference to the accompanying drawings. Throughout the drawings, the same reference numerals will refer to the same or like parts.

In assembled battery units, predetermined surface pressure is applied to the battery cells so as to maintain durability, wherein a thickness of the pouch type battery cell increases with use.

However, when the battery cells do not accommodate expansion caused by applying predetermined surface pressure thereto and the surface pressure is continuously applied thereto, an explosion and safety accident may occur by the damage to the battery cells.

Further, a thickness of a battery cell varies according to a battery capacity, and in order to accommodate the thickness of the battery cell and the required surface pressure, outer components for holding the battery cells are changed.

Figure 2:
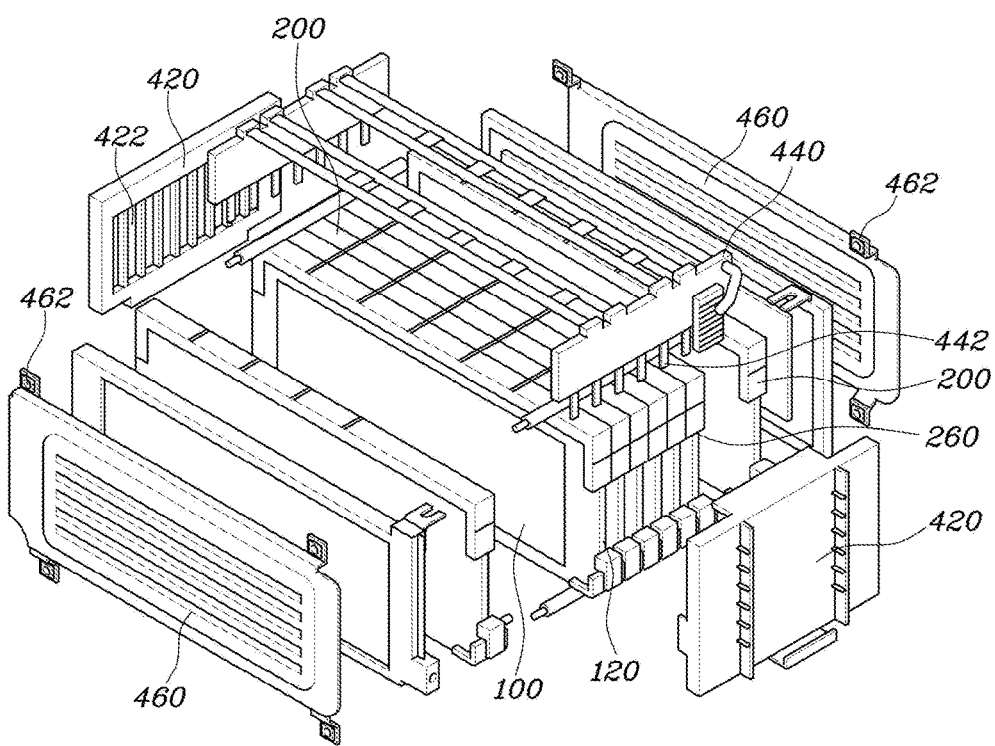
FIG. 2 is an exploded perspective view showing the battery unit of FIG. 1.
Figure 3:
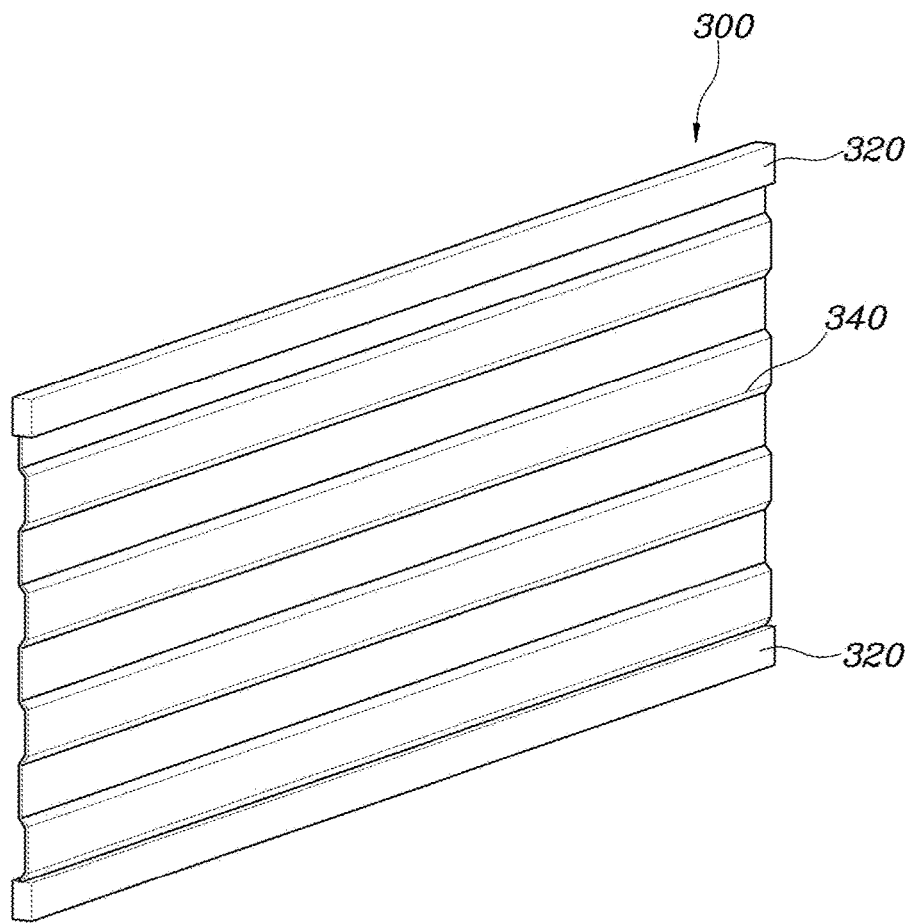
FIG. 3 is a view showing a deformable panel of the battery unit of FIG. 1.
Figure 4:
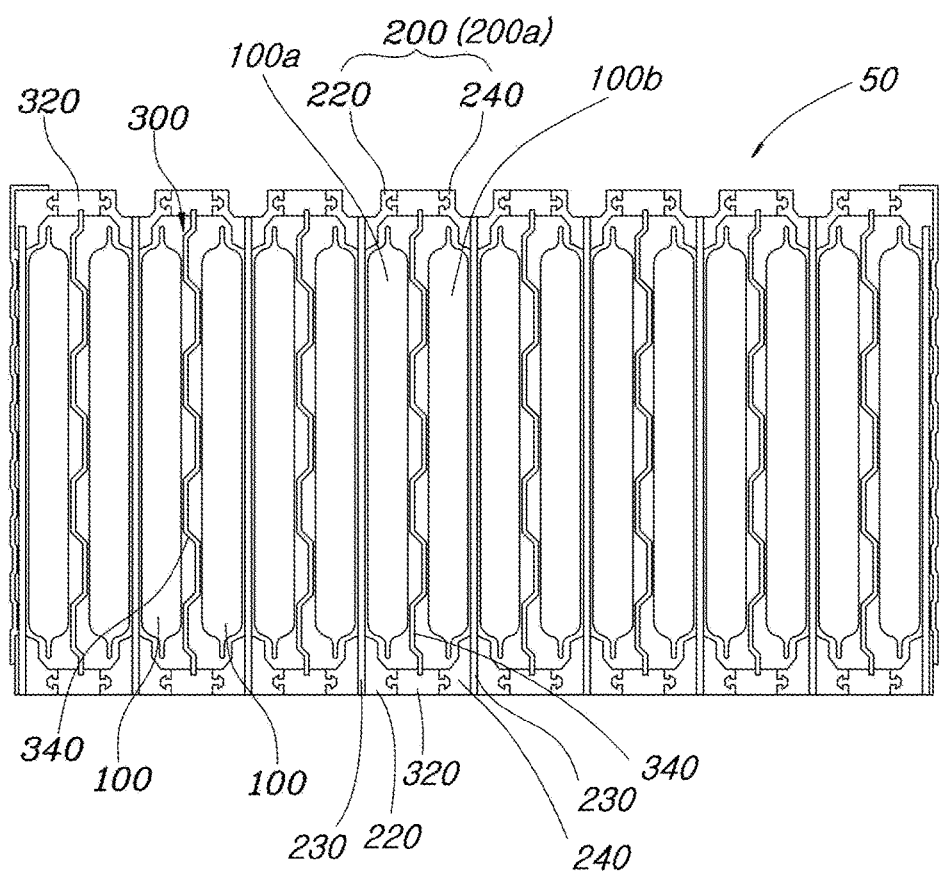
FIG. 4 is a cross-sectional view showing the battery unit of FIG. 1.
Figure 5:
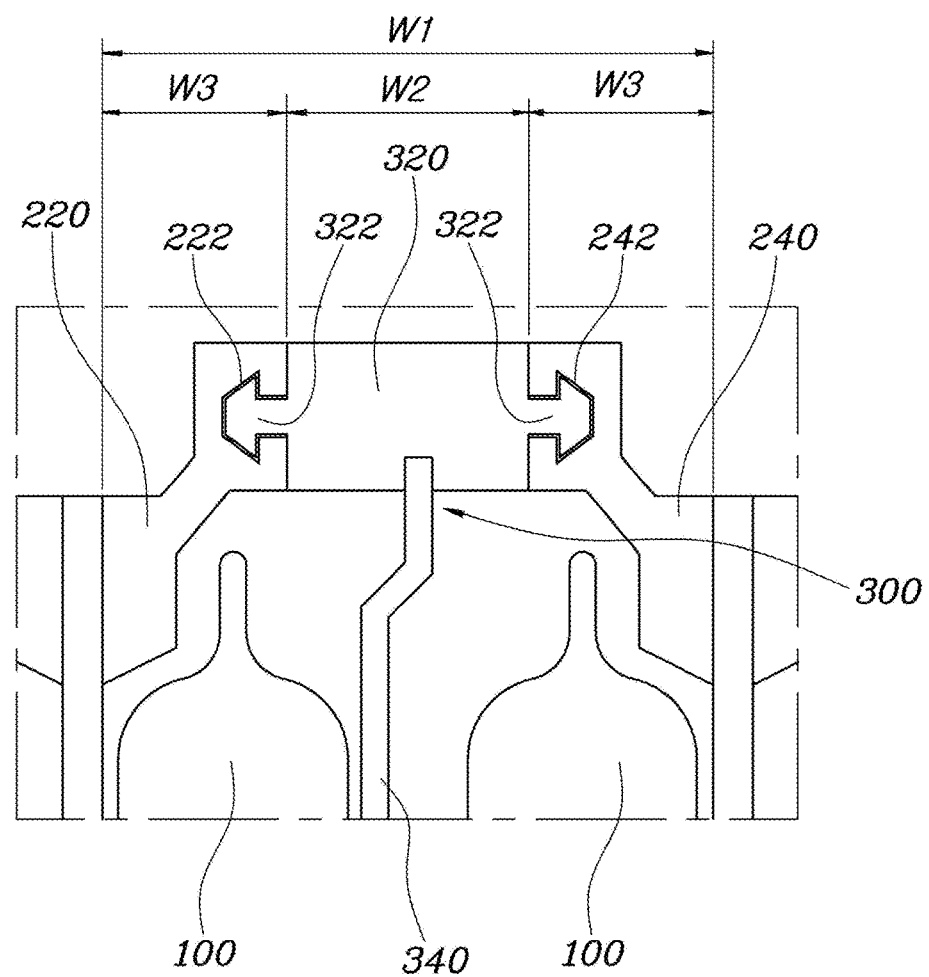
FIGS. 5 to 7 are view showing the battery unit of FIG. 1.
Figure 6:
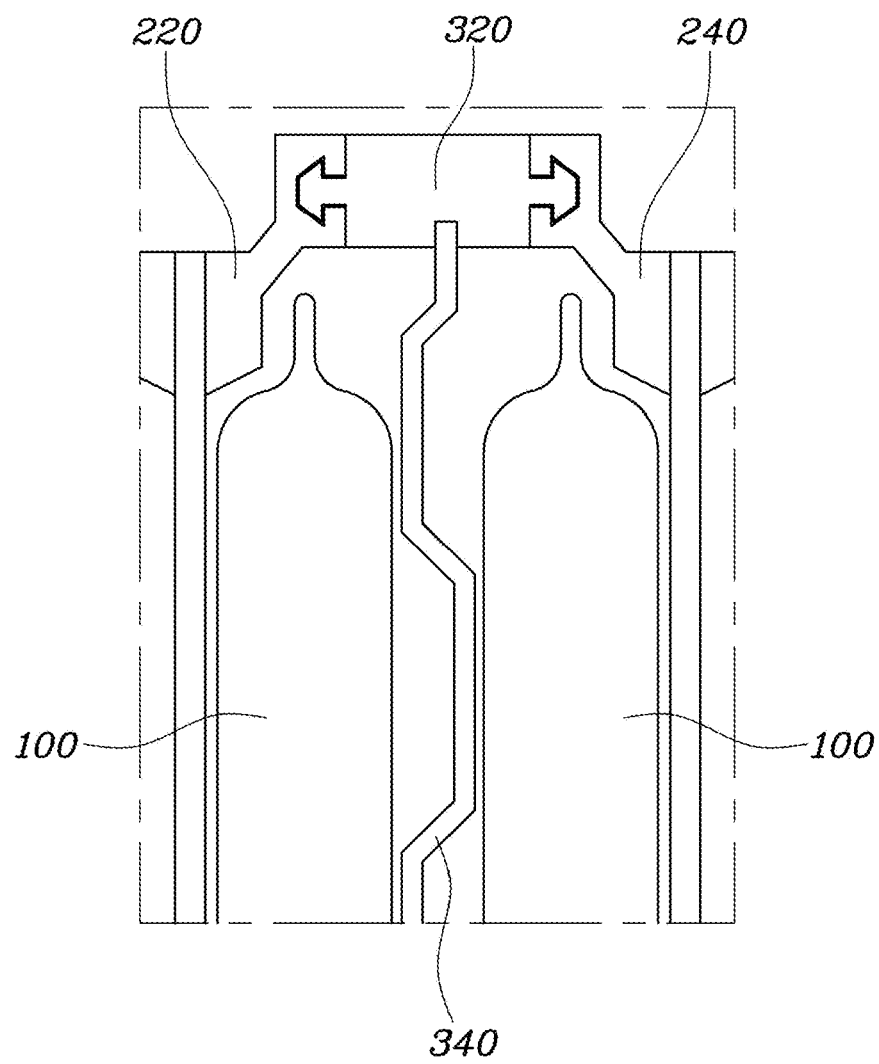
Figure 7:
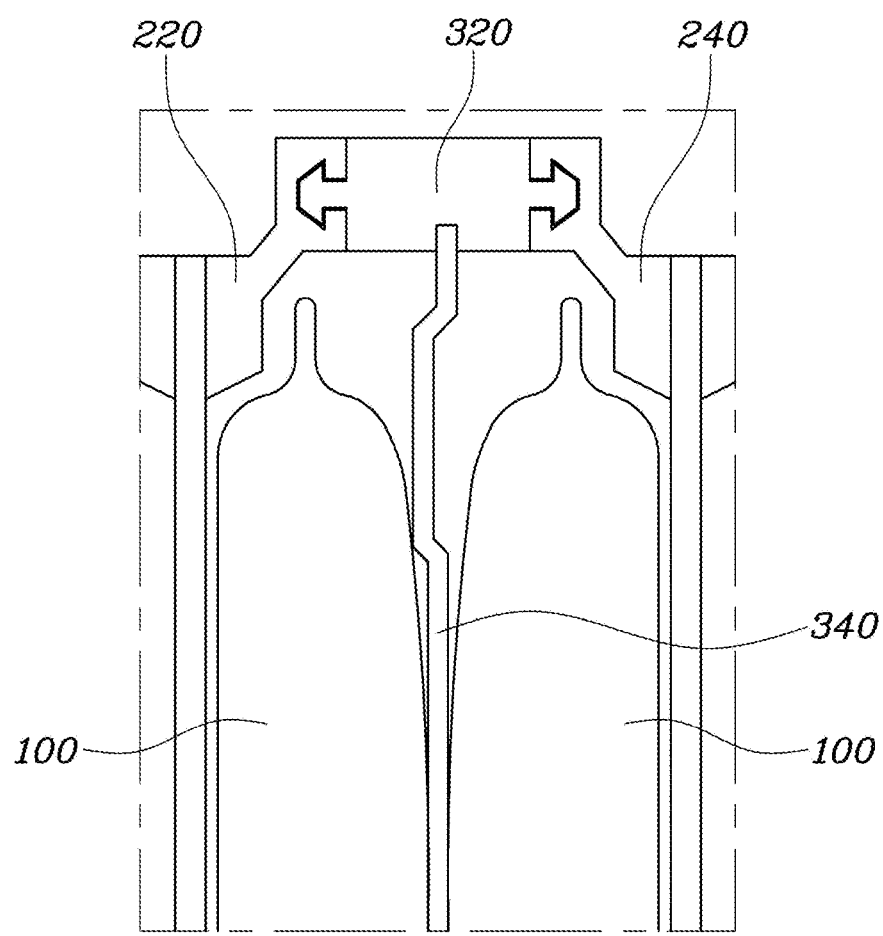

FIG. 1 is a perspective view showing a battery unit according to an embodiment of the present invention; FIG. 2 is an exploded perspective view showing the battery unit of FIG. 1; FIG. 3 is a view showing a deformable panel of the battery unit of FIG. 1; FIG. 4 is a cross-sectional view showing the battery unit of FIG. 1; and FIGS. 5 to 7 are view showing the battery unit of FIG. 1.

As shown in FIGS. 1 to 2, a battery unit according to embodiments of the present invention includes: cell holders 200 each provided with battery cells 100 and configured to surround the battery cells 100; a deformable panel 300 provided between the battery cells 100 of each of the cell holders 200, connected to the cell holder 200, and absorbing expansion of the battery cells 100 by being pressed and deformed by surface pressure applied to the battery cells when the battery cells 100 expand; and a battery case 400 receiving the cell holders 200 and the deformable panel 300 by layering the cell holders and the deformable panel.

As described above, the battery unit according to embodiments of the present invention is constituted by the battery case 400 receiving the battery cells 100, the cell holders 200, and the deformable panel 300 therein.

Herein, the battery case 400, in which the cell holders 200 and the deformable panel 300 are received by being layered, as shown in FIGS. 1 to 2, may include: a pair of side frames 420 provided with receiving grooves 422, with the cell holders 200 being received in and being locked to the receiving grooves; an electrical connector 440 provided with connection terminals 442 connected to the receiving grooves 422 of the side frames 420 so as to be electrically connected to the battery cells 100; and a pair of end plates 460 locked to opposite ends of the side frames 420 to connect the pair of side frames 420 to each other, thereby locking the cell holders 200 as a whole.

In other words, the battery case 400 is provided with the side frames 420, which the cell holders 200 receiving the battery cells 100 and the deformable panel 300 therein are accommodated and locked to, wherein the side frames 420 are formed with a plurality of receiving grooves 422 such that a plurality of the cell holders 200 are inserted into respective receiving grooves 422, thereby forming a sequentially layered structure. The electrical connector 440 electrically connected to the battery cells 100 is mounted to the side frames 420. In other words, the electrical connector 440 is provided with the connection terminals 442 that are inserted into the receiving grooves 422; each of the battery cells 100 is provided with an electric terminal 120 by extending therefrom; and each of the cell holders 200 is provided with a through-hole 260 for allowing the electric terminal to penetrate therethrough, whereby when the cell holders 200 are inserted into the receiving grooves 422 of the side frames 420, electric terminals 120 of the battery cells 100 are electrically connected to the connection terminals 442 of the electrical connector 440.

Further, a pair of end plates 460 is respectively locked to opposite ends of the pair of side frames 420. In other words, a plurality of the cell holders 200 is layered between the pair of end plates 460 locked to the side frames 420, and the end plates 460 support and lock the cell holders 200 as a whole, and thereby it is possible to protect the battery cells 100 in the cell holders 200 from external shocks and possible to allow predetermined surface pressure to be applied to the battery cells 100.

In addition, as shown in FIG. 1, the end plates 460 may include: locking parts 462 protrudingly provided at upper portions thereof; and support bars 465 connected to the locking parts 462 of the pair of end plates 460 at opposite ends thereof so as to support the end plates 460. In other words, the support bars 465 are connected to the locking parts 462 provided at upper portions of the pair of end plates 460, and thereby it is possible to obtain a sufficient bearing power of the end plates 460 and possible to prevent the end plates 460 from moving by cell expansion, thereby increasing durability of the battery case 400.

Hereinbelow, reference will be made in detail to the battery cells 100, the cell holders 200, and the deformable panel 300, which are structures for absorbing expansion of the battery cells 100 received in the battery case 400 in embodiments of the present invention.

In embodiments of the present invention, the battery cells 100 may be pouch type battery cells 100, and the cell holders 200 are configured to surround the battery cells 100 so as to lock the battery cells 100 inside the battery case 400.

Meanwhile, the deformable panel 300 is provided between the battery cells 100 of each of the cell holders 200, wherein the deformable panel 300 is provided to be connected to the cell holder 200 and to provide predetermined surface pressure to the battery cells 100. In particular, the deformable panel 300 absorbs expansion of the battery cells 100 by being deformed by surface pressure applied to the battery cells when the battery cells 100 expand. As shown in FIGS. 3 to 4, the deformable panel 300 may be formed in a corrugated shape where convex parts and concave parts are formed repeatedly, wherein the convex parts and concave parts may be flattened when pressed when the battery cells 100 expand, thereby absorbing expansion of the battery cells 100. Thus, it is possible to prevent the battery unit from being damaged by expansion of the battery cells 100.

To be more specific, as shown in FIG. 4, each of the cell holders 200 may include a first cover 220 and a second cover 240 each provided with connection structures at upper and lower portions thereof; and the deformable panel 300 may be disposed between the first cover 220 and the second cover 240, and may include: mounting parts 320 mounted through the connection structures provided at the upper and lower portions of the first cover 220 and the second cover 240; and a deformable part 340 provided between the battery cells 100, connected to the mounting parts 320 provided at upper and lower portions of the deformable panel, and the deformable part 340 being deformable by cell expansion.

As described above, each of the cell holders 200 includes the first cover 220 and the second cover 240 each provided with the connection structures at upper and lower portions of the first cover 220 and the second cover 240, and the mounting parts 320 of the deformable panel 300 are respectively engaged with the first cover 220 and the second cover 240, and thereby the first cover 220 and the second cover 240 are connected to each other.

In other words, as shown in FIG. 5, the first cover 220 and the second cover 240 may be respectively provided with first seat grooves 222 and second seat grooves 242 in facing surfaces of the upper and lower portions thereof; and the mounting parts of the deformable panel 300 may be provided with clip protrusions 322 protruding toward opposite directions to be engaged with both the first seat grooves 222 and the second seat grooves 242 and locked thereto. In other words, connection structures for allowing the first cover 220 and the second cover 240 to be connected to the mounting parts 320 are the first seat grooves 222, the second seat grooves 242, and the clip protrusions 322.

Accordingly, the first cover 220 is provided with the first seat grooves 222 at upper and lower portions thereof, and the second cover 240 is provided with the second seat grooves 242 corresponding to the first seat grooves 222 at upper and lower portions thereof, and thereby it is possible to simply assemble the cell holders by the engage the clip protrusions 322 formed in the mounting parts 320 with the first seat grooves 222 and the second seat grooves 242, after that it is possible to disassemble the cell holders 200 and the deformable panel 300. Herein, the clip protrusions 322 formed in the mounting parts 320 may have inclined surfaces such that the clip protrusions are easily engaged with the first seat grooves 222 and the second seat grooves 242 by the inclined surfaces, and the clip protrusions are prevented from being separated by being hooked to the first seat grooves 222 and the second seat grooves 242.

As described above, the deformable panel 300 disposed between the first cover 220 and the second cover 240 of each of the cell holders 200 is allowed to be assembled and disassembled, and thereby the deformable panel 300 can be replaced according to the thicknesses of the battery cells 100, and on the contrary, the cell holders 200 can be shared.

As described above, each of the cell holders 200 may be in the form of a single unit by the first cover 220 and the second cover 240 assembled by the deformable panel 300, or may be configured to be adjustable according to the thicknesses of the battery cells 100 by sharing the cell holders 200 and by replacing the deformable panel 300, as a medium structure.

Meanwhile, the deformable part 340 connects the mounting parts 320 mounted to the upper and lower portions of the first cover 220 and the second cover 240, and is formed by extending to face the battery cells 100 and is deformable so as to absorb expansion of the battery cells 100 by being deformed when the battery cells 100 expand.

Herein, the deformable part 340 of the deformable panel 300 may alternately protrude toward a battery cell provided on a first side thereof and toward another battery cell provided on a second side thereof, along a longitudinal direction thereof. Through this manner, the deformable panel 300 has convex parts, wherein the convex parts may be flattened when pressed when the battery cells 100 expand. Thereby, the deformable panel 300 applying the predetermined surface pressure to the battery cells 100 is deformed by expansion of the battery cells 100 thus absorbing expansion of the battery cells 100, and thereby it is possible increase durability of the battery cells 100.

Preferably, the deformable part 340 extends horizontally after the deformable part protrudes toward a battery cell provided on a first side thereof, and then protrudes toward another battery cell provided on a second side thereof in the same manner, such that the deformable part 340 of the deformable panel 300 easily applies the predetermined surface pressure to the battery cells 100 by area contact, and is easily deformed in response to expansion of the battery cells 100, thereby absorbing the expansion of the battery cells 100.

Thereby, as shown in FIG. 6, in the beginning, the deformable part 340 of the deformable panel 300 maintains the corrugated shape thereof since the battery cells 100 do not expand. In this state, as shown in FIG. 7, when the battery cells 100 expand, the convex parts of the deformable part 340 of the deformable panel 300 are deformed by being pressed by the battery cells 100, thereby absorbing expansion of the battery cells 100.

Meanwhile, a length of each of the mounting parts 320 of the deformable panel 300 is shorter than a sum of thicknesses of the battery cells 100 of each of the cell holders, and is variable according to the thickness of the battery cells 100.

The thickness of the battery cells 100 may vary according to electric power required by electric vehicle or hybrid vehicles. In a typical battery unit, in the case of changing the thickness of the battery cells 100, the entire structure should be changed according to the thickness of the battery cells 100. However, in embodiments of the present invention, the length of the mounting parts 320 of the deformable panel 300 is variable according to the thickness of the battery cells 100, and thereby when the thickness of the battery cells 100 is changed, a structure including the cell holders 200 may be shared without changing the structure.

The battery unit configured as described above provides predetermined surface pressure to battery cells 100 and absorbs expansion of the battery cells 100, thereby increasing durability. Further, by dualizing components for absorbing surface pressure of the battery cells 100, it is possible to reduce manufacturing cost because the rest of the components are communized.

In embodiments, referring to FIGS. 3-7, an automobile battery unit 50 includes a plurality of battery cells and a plurality of battery cell holders 200 for holding the plurality of battery cells 100. Each battery cell 100 includes a first surface and a second surface that faces away from and is generally parallel to the first surface in its non-expanded or non-inflated state. Each of the plurality of battery cell holders 200 holds two or more of the plurality of battery cells 100. In the illustrated embodiment, each holder 200 holds two battery cells 100.

In embodiments, a first holder 200a of the plurality of battery cell holders 200 holds a first battery cell 100a and a second battery cell 100b of the plurality of battery cells 100. The automobile battery unit 50 further includes a corrugated plate 340 inserted between the first battery cell 100a and the second battery cell 100b that are held within the first battery cell holder 200a and are immediately neighboring each other. The corrugated plate 340 includes a first side and a second side facing away from the first side, In embodiments, the first side of the corrugated plate 340 includes a plurality of first surfaces contacting the first surface of the first battery cell 100a in a non-inflated state of the first and second battery cells. The second side of the corrugated plate 340 includes a plurality of second surfaces contacting the second surface of the second battery cell 100b in the non-inflated state of the first and second battery cells such that the corrugated plate 340 pushes the first and second battery cells away from each other in the non-inflated state of the battery cells 100a and 100b. The corrugated plate 340 further deforms and absorbs pressure from each of the first and second battery cells 100a and 100b as either or both of the first and second battery cells inflates.

In embodiments, the holder 200 includes two support plates 230 and the battery cells 100a and 100b are disposed therebetween. The cell holder 200 further includes covers 220 and 240 and a coupler or mounting part 320 coupled to and interconnecting the covers 220 and 240 at each of the upper and lower portions of the cell holder. Each of the covers 220 and 240 is attached to one of the support plates 230. In embodiments, the couplers 320 and the corrugated plate or deformable part 340 are integrated to form a deformable panel 300 which can be handled as one component when assembling the battery unit 50.

In embodiments, the support plates 230, the covers 220 and 240 and the coupler 320 are more rigid than the corrugated plate 340 such that the corrugated plate 340 is deformed to push the battery cells 100a and 100b when either or both of the battery cells 100a and 100b inflate.

In embodiments, the coupler 320 and each of the covers 220 and 240 are integrated to each other by a snap-fit engagement. For the snap-fit engagement, in embodiments, the coupler and the cover include interlocking structures, for example, a protrusion and a grove. In one embodiment, the protrusion and the groove include undercuts for the snap-fit. Further, the engaging protrusion and the engaging groove extend along a length direction of the coupler throughout the length of the coupler or throughout the length of the battery cells such that the pressure by the deformed, corrugated plate can be applied throughout the length of the battery cell 100a or 100b.

In embodiments, the distance W1 between two support plates 230 varies depending on the width W2 of the coupler 320 when the width W3 of each cover 220 or 240 is fixed. The width W2 of the coupler 320 is sized such that, in the non-inflated state of the battery cells 100a and 100b within the holder 200a, the battery cells 100a and 100b push the corrugated plate 340 for resiliently deforming the corrugated plate 340 and that the deformed, corrugated plate 340 pushes back the first and second battery cells away from each other.

In embodiments, the coupler 320 and each of the covers 220 and 240 are integrated to each other by a snap-fit engagement. For the snap-fit engagement, in embodiments, the coupler and the cover include interlocking structures, for example, a protrusion with an undercut and a groove with another undercut.

Although an embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery unit comprising:
    cell holders, each of which is configured to hold battery cells and configured to surround the battery cells;
    a deformable panel provided between the battery cells within each of the cell holders, connected to the cell holder, and absorbing expansion of the battery cells by being pressed and deformed by surface pressure applied to the battery cells when the battery cells expand;
    a battery case configured to receive the cell holders and the deformable panel by layering the cell holders and the deformable panel,
    wherein each of the cell holders comprises first covers and second covers, each of which is provided with a connection structure, wherein the first covers are disposed at a first side in a thickness direction of each cell holder and disposed at upper and lower portions of each cell holder, respectively, wherein the second covers are disposed at a second side in the thickness direction of each cell holder and disposed at the upper and lower portions of each cell holder, respectively,
    wherein the deformable panel comprises mounting parts disposed between the first covers and the second covers and mounted through the connection structures to connect the first covers and the second covers to each other,
    wherein the deformable panel further comprises a deformable part provided between the battery cells and connected to the mounting parts provided at upper and lower portions of the deformable panel, the deformable part being corrugated and configured to be resiliently deformed by cell expansion.

2. The battery unit of claim 1, wherein
    the first covers are provided with first seat grooves and the second covers are provided with second seat grooves; and
    the mounting parts of the deformable panel are provided with clip protrusions protruding toward opposite directions to be engaged with both the first seat grooves and the second seat grooves and locked thereto.

3. The battery unit of claim 1, wherein
    the deformable part of the deformable panel alternately protrudes toward a battery cell provided on a first side thereof and toward another battery cell provided on a second side thereof, along a longitudinal direction thereof.

4. The battery unit of claim 1, wherein
    after the deformable part protrudes toward a battery cell provided on a first side thereof, the deformable part extends horizontally and protrudes toward another battery cell provided on a second side thereof in a same manner.

5. The battery unit of claim 1, wherein
    a length of each of the mounting parts of the deformable panel is shorter than a sum of thicknesses of the battery cells of each of the cell holders, and is variable according to the thickness of the battery cells.

6. The battery unit of claim 1, wherein
    each of the battery cells is provided with an electric terminal, and each of the cell holders is provided with a through-hole for allowing the electric terminal to penetrate therethrough.

7. The battery unit of claim 1, wherein
    the battery case includes:
    a pair of side frames provided with receiving grooves, with the cell holders being received in and being locked to the receiving grooves;
    an electrical connector provided with connection terminals connected to the receiving grooves of the side frames so as to be electrically connected to the battery cells; and
    a pair of end plates locked to opposite ends of the side frames to connect the pair of side frames to each other, thereby locking the cell holders as a whole.

8. The battery unit of claim 7, wherein
    the end plates include: locking parts protrudingly provided at upper portions thereof; and support bars connected to the locking parts of the pair of end plates at opposite ends thereof so as to support the end plates.

\* \* \* \* \*